United States Patent [19]

Poli et al.

[11] Patent Number: 5,074,638
[45] Date of Patent: Dec. 24, 1991

[54] METHOD FOR JOINING OPTICAL FIBERS AT THE FIBER INTERFACE OF A BEVELED ANGLE FIBER OPTIC CONNECTOR

[75] Inventors: Robert G. Poli, Campbell, Calif.; Robert A. Gutcheck, Bothell, Wash.; V. Stanton Thomas, Palo Alto; Gerald G. Vurek, Mountain View, both of Calif.

[73] Assignee: Abbott Laboratories, Abbott Park, Ill.

[21] Appl. No.: 629,323

[22] Filed: Dec. 18, 1990

[51] Int. Cl.⁵ .............................................. G02B 6/38
[52] U.S. Cl. ...................................... 385/50; 385/52; 385/60
[58] Field of Search ............................. 350/96.2, 96.21

[56] References Cited

U.S. PATENT DOCUMENTS

| | | | |
|---|---|---|---|
| 4,645,295 | 2/1987 | Pronovost | 350/96.21 |
| 4,695,126 | 9/1987 | Cook | 350/96.2 |
| 4,978,193 | 12/1990 | Tomita | 350/96.20 |
| 5,007,704 | 4/1991 | McCartney | 350/96.21 |

Primary Examiner—John D. Lee
Assistant Examiner—Stephen W. Barns
Attorney, Agent, or Firm—Harry G. Thibault; Robert E. Wexler

[57] ABSTRACT

A method for aligning first and second optical fibers of a fiber optic connector at a fiber interface wherein the first optical fiber has a beveled angle end face and the second optical fiber a complementary beveled angle end face, the method including the step of abutting the respective fiber end faces at an angle at the interface, cooperatively engaging a vertical reference surface associated with the first optical fiber with a vertical reference nodule associated with the second optical fiber to align the respective fiber end faces at a vertical aligned position for the connector. Respective horizontal reference surfaces associated with the first optical fiber are also cooperatively engaged with a horizontal reference node and a compressible crush rib associated with the second optical fiber to align the respective fiber end faces at a horizontal aligned position for the connector. The method also holds the respective fiber end faces in suitable connector members in abutting and full engagement at the fiber interface, within a connector enclosure, in a fixed aligned position, in which the vertical aligned position is coincident with the horizontal aligned position for the optical fibers of the connector.

17 Claims, 8 Drawing Sheets

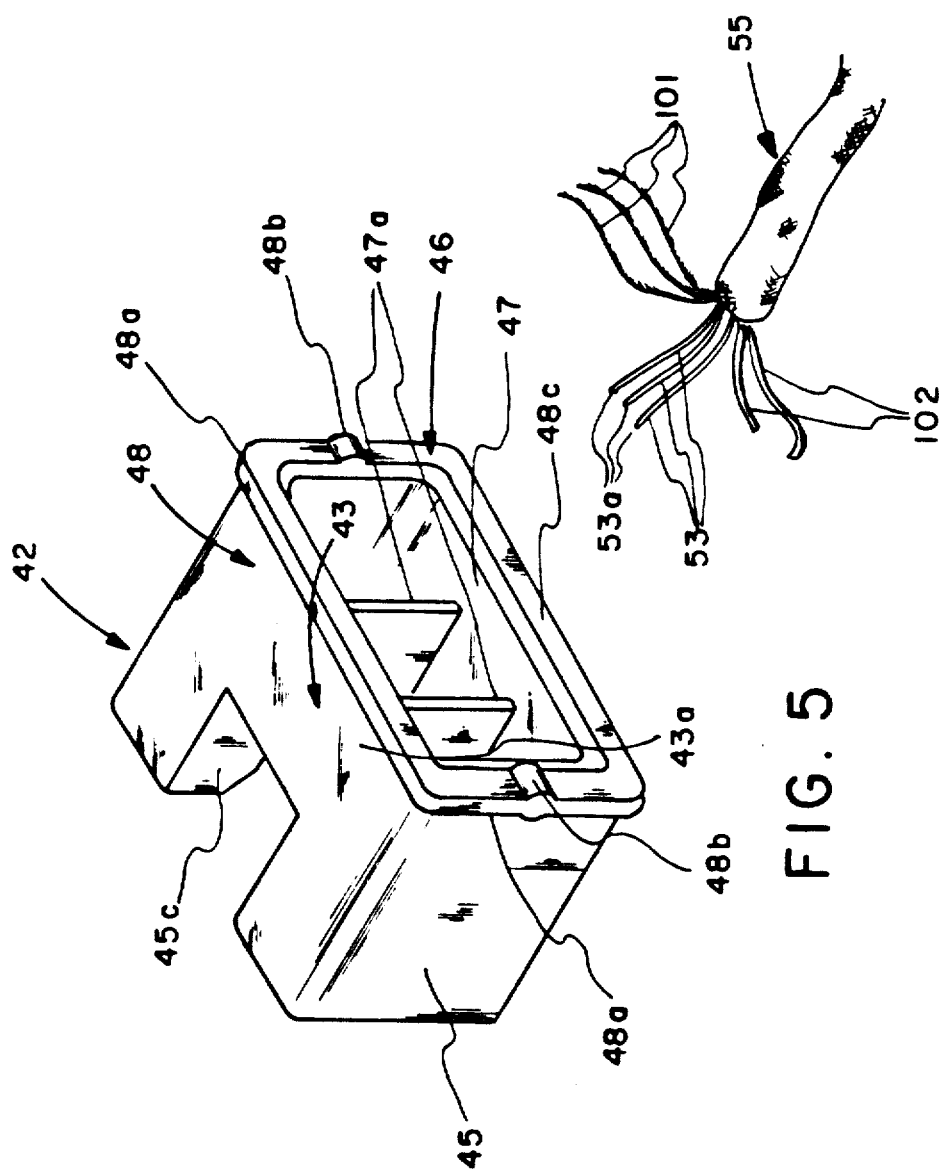

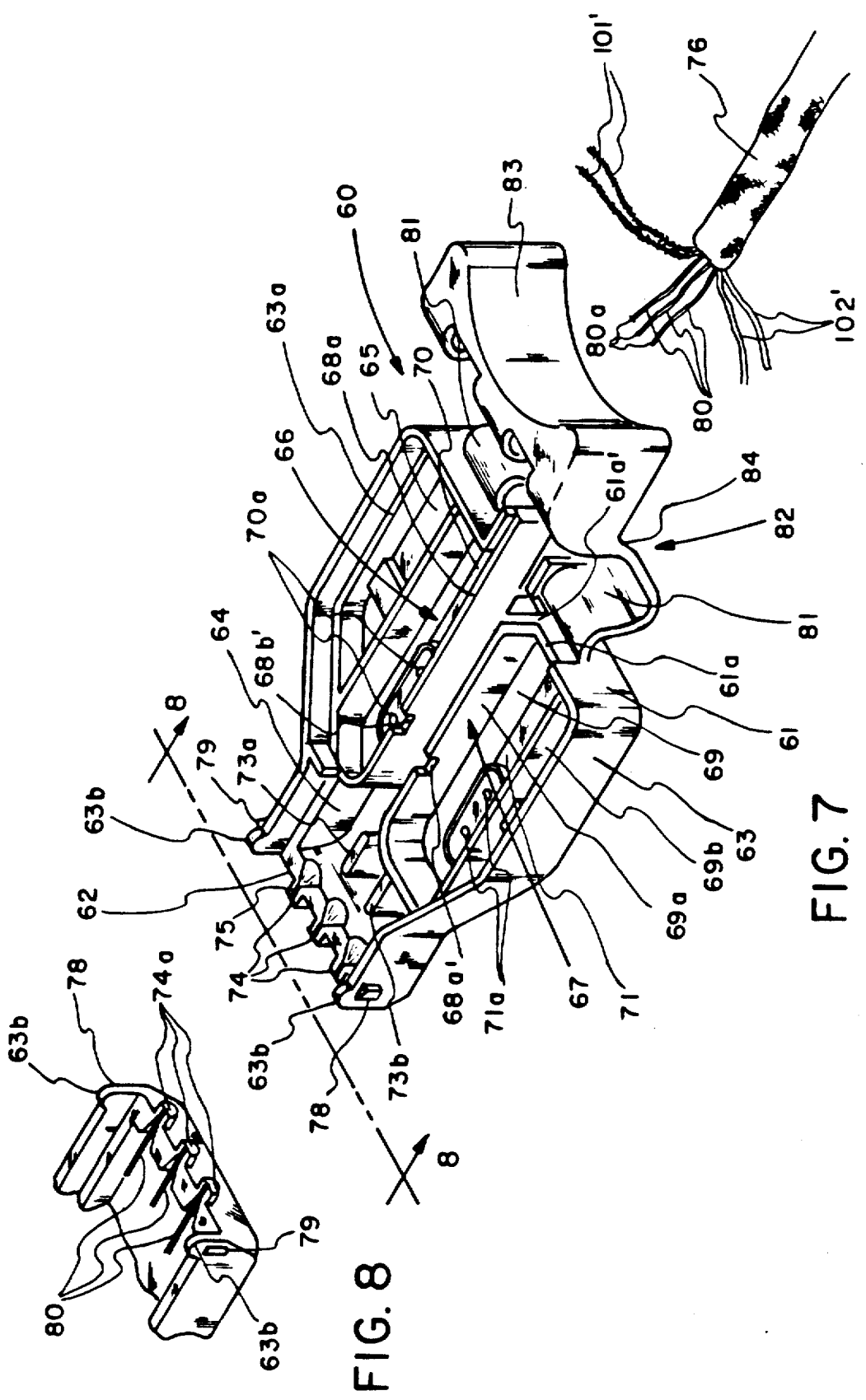

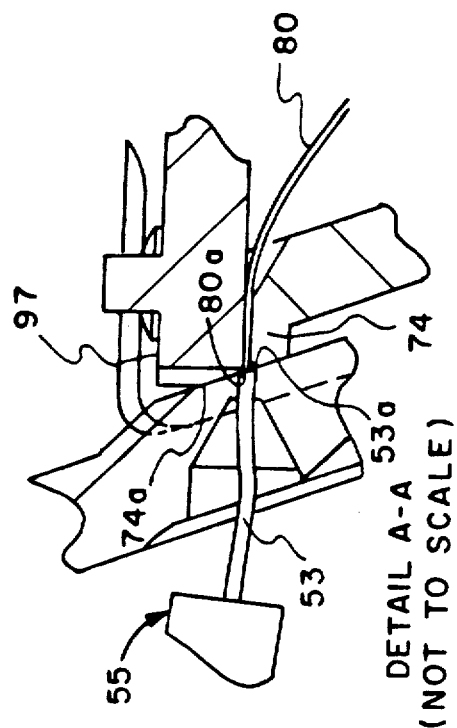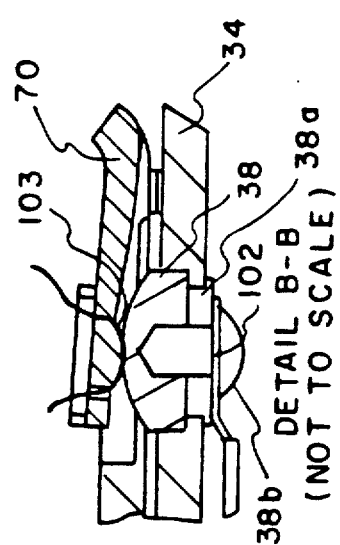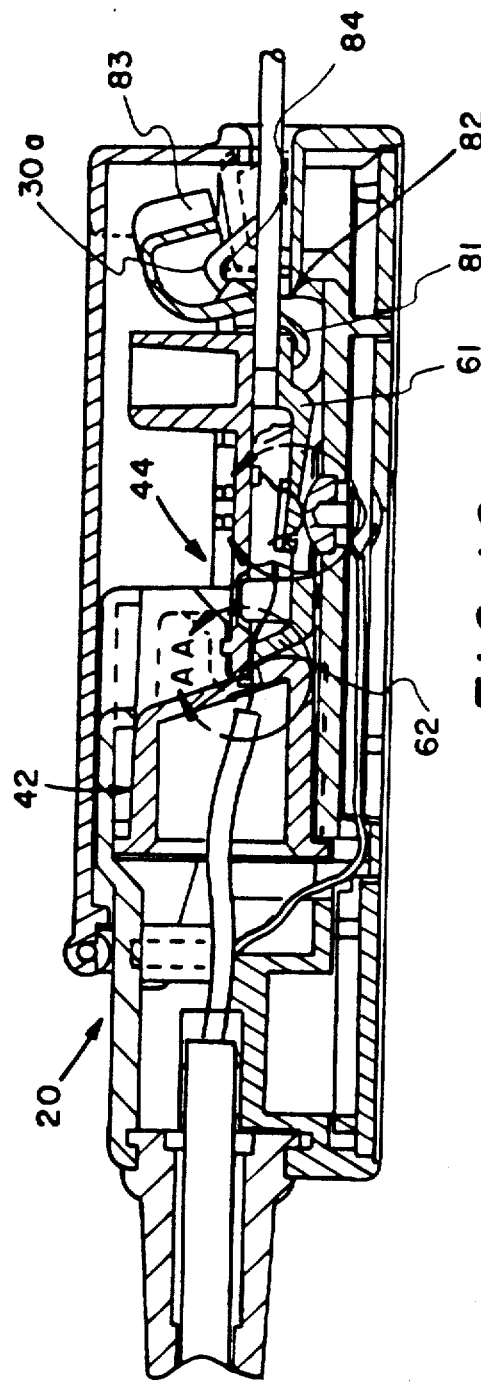

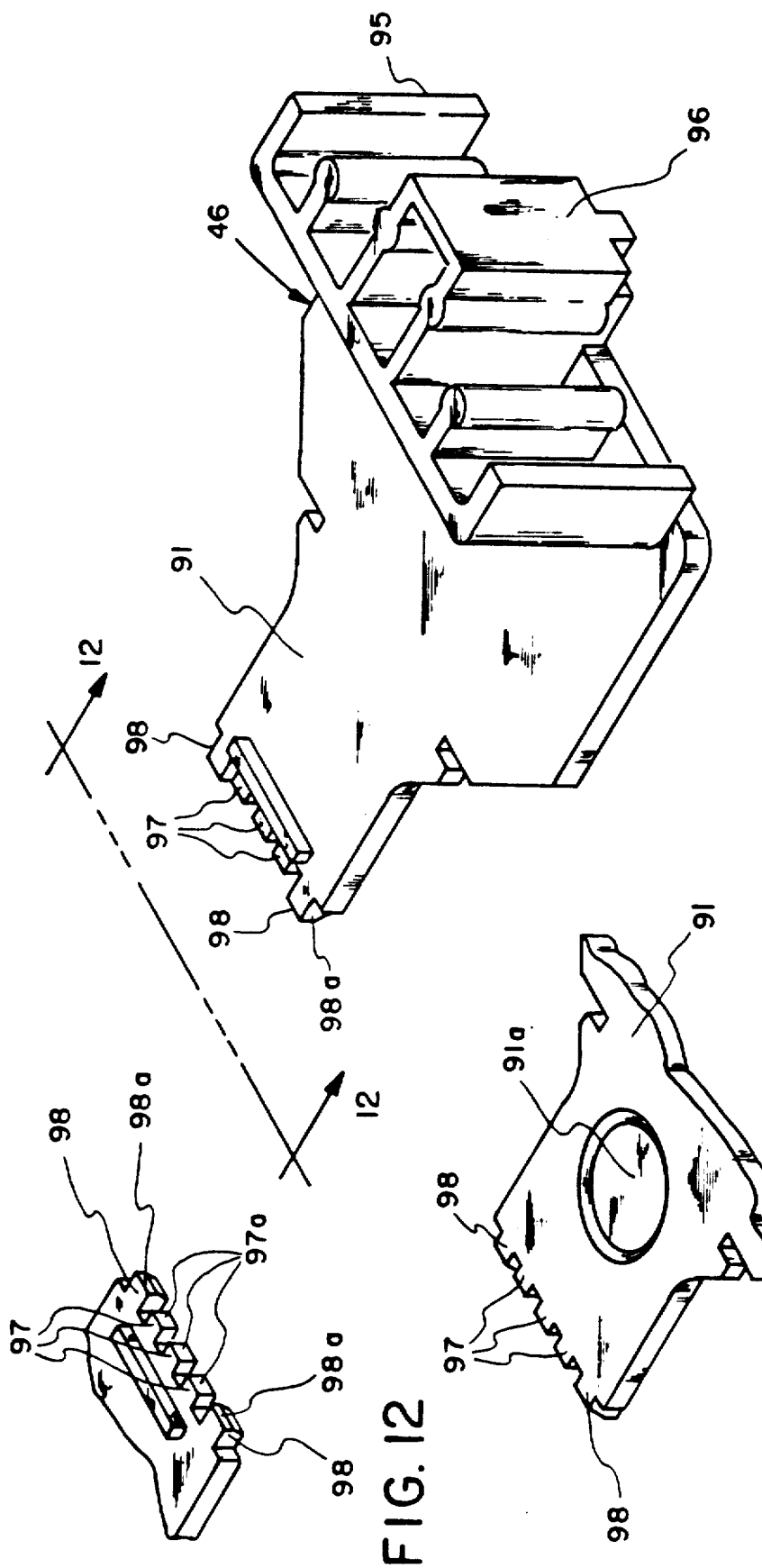

METHOD FOR JOINING OPTICAL FIBERS AT THE FIBER INTERFACE OF A BEVELED ANGLE FIBER OPTIC CONNECTOR

BACKGROUND OF THE INVENTION

1. Field of the Invention

The present invention relates to a fiber optic connector, and specifically to a fiber optic connector that aligns optical fibers mounted in one portion of the connector with optical fibers mounted in another portion of the connector.

2. Description of the Prior Art

Optical fibers are often used for data transmission because of their wide bandwidth and capacity for carrying data in the form of light signals that are unaffected by electromagnetic fields. However, one drawback to the use of optical fibers is the difficulty involved in properly connecting two optical fibers at a connector. Signal losses in the transfer of data across an interface between optical fibers in a connector can cause substantial problems in the transfer of data. If the abutting optical fibers are not properly aligned, a substantial portion of the signal can be lost at the interface. Proper alignment of the optical fibers to minimize signal losses is difficult, because these fibers typically have a diameter comparable to that of a human hair. Any misalignment of the fibers at their interface in the connector can cause light signals transmitted along one optical fiber to be absorbed by cladding that surrounds the second optical fiber. As a result, a substantial portion of the signal conveying data along the optical fibers can be lost, thereby increasing the risk of data loss.

U.S. Pat. No. 4,695,126 shows a connector in which a pair of optical fibers form an angle where their ends meet. This angled interface is used for both reducing reflections and providing mechanical registration of the ends of the abutting optical fibers. However, if one portion of a connector is repeatedly connected to and disconnected from another portion of the connector, means must be provided to enable the repeated and precise alignment of the abutting ends of the optical fibers. This patent does not disclose how such repeated alignment can be accomplished.

Besides aligning the optical fibers in their respective connector parts, a connector must ensure the quality of the interface between the optical fibers. For example, it is desirable to maximize the force of contact at the interface between their abutting ends. Any offsets, incongruities, or other defects occurring at the interface can substantially impair the quality of data transmission through the connector. Further, the need for consistent and accurate alignment of the respective fibers disposed in opposite portions of the connector is substantially complicated by the requirement that different mating connector portions be readily interchangeable with similar connector portions.

In a specific application of this data transmission technology, an optical fiber connector is required that includes a non-disposable member in which one or more generally parallel optical fibers are disposed. This connector member must connect with a complementary disposable member in which a corresponding number of generally parallel optical fibers are mounted. When the connector members are assembled, the optical fibers in the non-disposable member must intimately contact and be substantially aligned with the complementary optical fibers in the disposable member.

Such a connector is intended for use in a hospital environment, to convey data from a sensor to a processing apparatus that is part of a patient monitoring system. The non-disposable member of the connector is associated with a data line connected to the patient monitoring system, and a disposable member of the connector is connected to the sensor, which is inserted into a patient's cardiovascular system. It is contemplated that the monitoring system may be used with a number of patients, e.g., the monitor may stay with a single patient until its intended use is completed and then disconnected from that patient and connected to a second patient through the disposable member of a different connector.

Furthermore, it may be necessary to move a patient connected to a monitoring system from one room to another, and it may be undesirable to move the monitoring system associated with that patient. Accordingly, it may be necessary that the patient be disconnected from the first monitoring system and reconnected to a second monitoring system located in another hospital room.

Realistically, the critical dimensions of the connector members may vary within manufacturing tolerances. It would thus be highly desirable to provide a connector design that enables the optical fibers in the non-disposable member to precisely align with and fully contact the optical fibers and the disposable member at the interface of the connector, with each and every connection, regardless of any small variation in the critical dimensions of the connector members.

Therefore, it is desirable that variations due to manufacturing tolerances in the connector members be accommodated to assure that the optical fibers mounted in the respective non-disposable and disposable members are substantially aligned whenever there is a completed connection. Such alignment cannot rely on the matching of a specific pair of non-disposable and disposable members of the connector. Further, it would be desirable to provide specific alignment means to positively align the optical fibers of the non-disposable member of the connector with those of the disposable member of the connector, both horizontally and vertically, to minimize any offset of the respective optical fibers when the connector is assembled. It would also be desirable to modify the abutting faces of respective optical fibers disposed on opposite sides of the connector interface, to minimize incongruities therein. Such modification should maximize contact of the complementary optical fibers at the interface of the two connector members.

Because of the extreme fragility of the optical fibers, it would be desirable to provide wear surfaces to minimize wear on critical portions of the connector members during the engagement and alignment of the disposable and non-disposable members of the connector. It would further be desirable to provide means for electrically connecting conductors that are mounted in the disposable and non-disposable members of the connector. Disposable and non-disposable members of the connector should lock in a fixed, aligned position when engaged.

SUMMARY OF THE INVENTION

In accordance with the present invention, a fiber optic connector includes one or more first optical fibers and one or more second optical fibers, each first optical fiber having a complementary beveled end face, the respective first and second fiber end faces abutting each other at an angle at a fiber interface. Means are provided for aligning each first optical fiber with its respective second optical fiber at the interface of the fiber optic connector.

A non-disposable member of the connector includes a front face which holds a beveled end face of one or more first optical fibers mounted therein. A disposable connector member includes a front face which holds a complementary beveled end face of one or more corresponding second optical fibers mounted therein.

A vertical reference surface associated with the first optical fibers is cooperative with a vertical reference node associated with the second optical fibers to define a vertical aligned position for the respective fiber end faces at the fiber interface.

A horizontal reference surface associated with the first optical fibers is cooperative with a horizontal reference node associated with the second optical fibers to define a horizontal aligned position for the respective fiber end faces at the fiber interface.

The fiber optic connector also includes forward alignment means provided in the disposable member which serve as wear surfaces to protect the end faces of respective abutting optical fibers disposed in the non-disposable and disposable connector members. In addition, the connector includes means for electrically connecting the non-disposable member to its complementary disposable member.

The respective horizontal and vertical alignment means assure that the respective optical fibers will be precisely and accurately aligned, that such alignment will occur with a minimum of wear, repeatedly and accurately, independent of any manufacturing tolerances associated with the non-disposable and disposable members of the connector.

These and other advantages will be better understood when the drawings, described briefly below, are considered with the detailed description of the preferred embodiment of the present invention.

BRIEF DESCRIPTION OF THE DRAWINGS

FIG. 5 is a top perspective view taken from the rear of the non-disposable member of FIG. 3;

FIG. 6 is a perspective view of a fiber optic cable assembly associated with the non-disposable member shown in FIG. 5;

FIG. 7 is a top perspective view of the disposable member of the fiber optic connector of the present invention, with a cover of the disposable member removed;

FIG. 8 is a cut away perspective view of a portion of the disposable member, rotated in respect to the view of FIG. 7;

FIG. 10 is a side sectional view taken along line 10—10 of FIG. 1;

FIG. 10A is the detail A—A of FIG. 10;

FIG. 10B is the detail B—B of FIG. 10;

FIG. 11 is a top perspective view of the cover of the disposable member of the fiber optic connector shown in FIG. 7;

FIG. 12 is a cut away top perspective view of a portion of the cover, for the disposable member, rotated in respect of the view in FIG. 11; and FIG. 13 is a cut away perspective view of a portion of the cover of FIG. 11, rotated 180° to show the bottom thereof.

DETAILED DESCRIPTION OF THE PREFERRED EMBODIMENT

Figure 1:
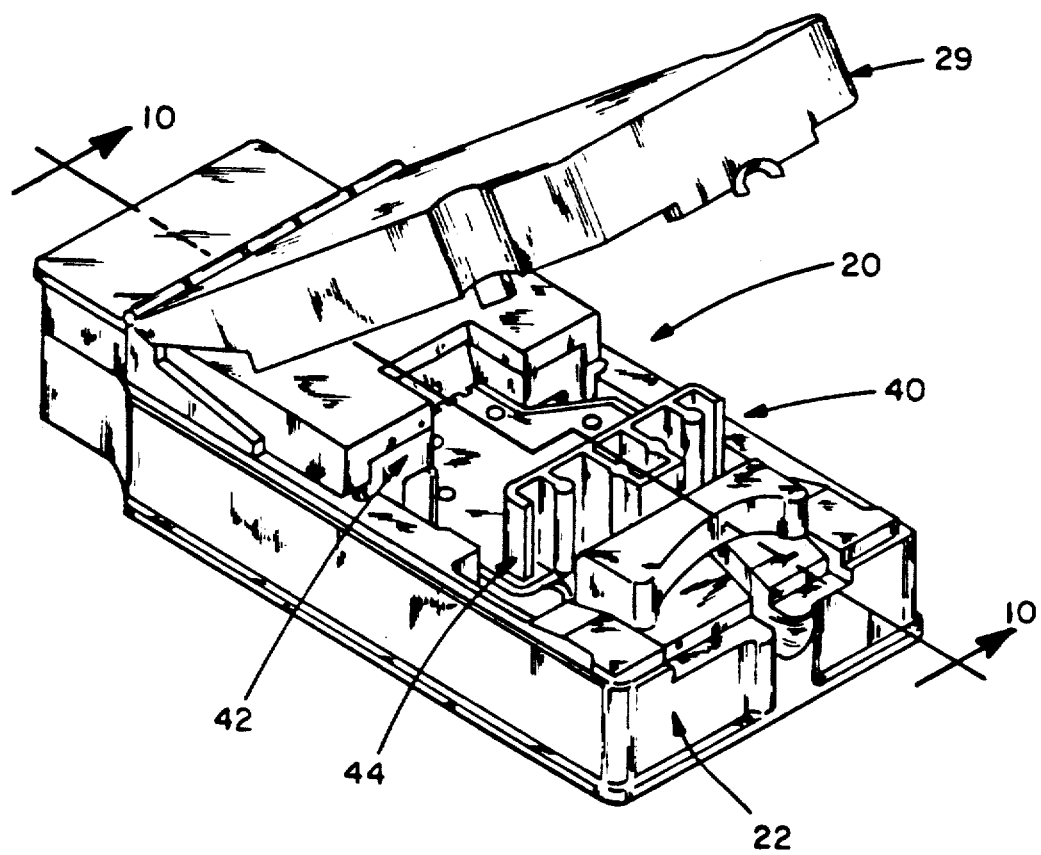
FIG. 1 is a front perspective view of the fiber optic connector of the present invention disposed in an assembled position within an optical module for the connector.
Figure 2:
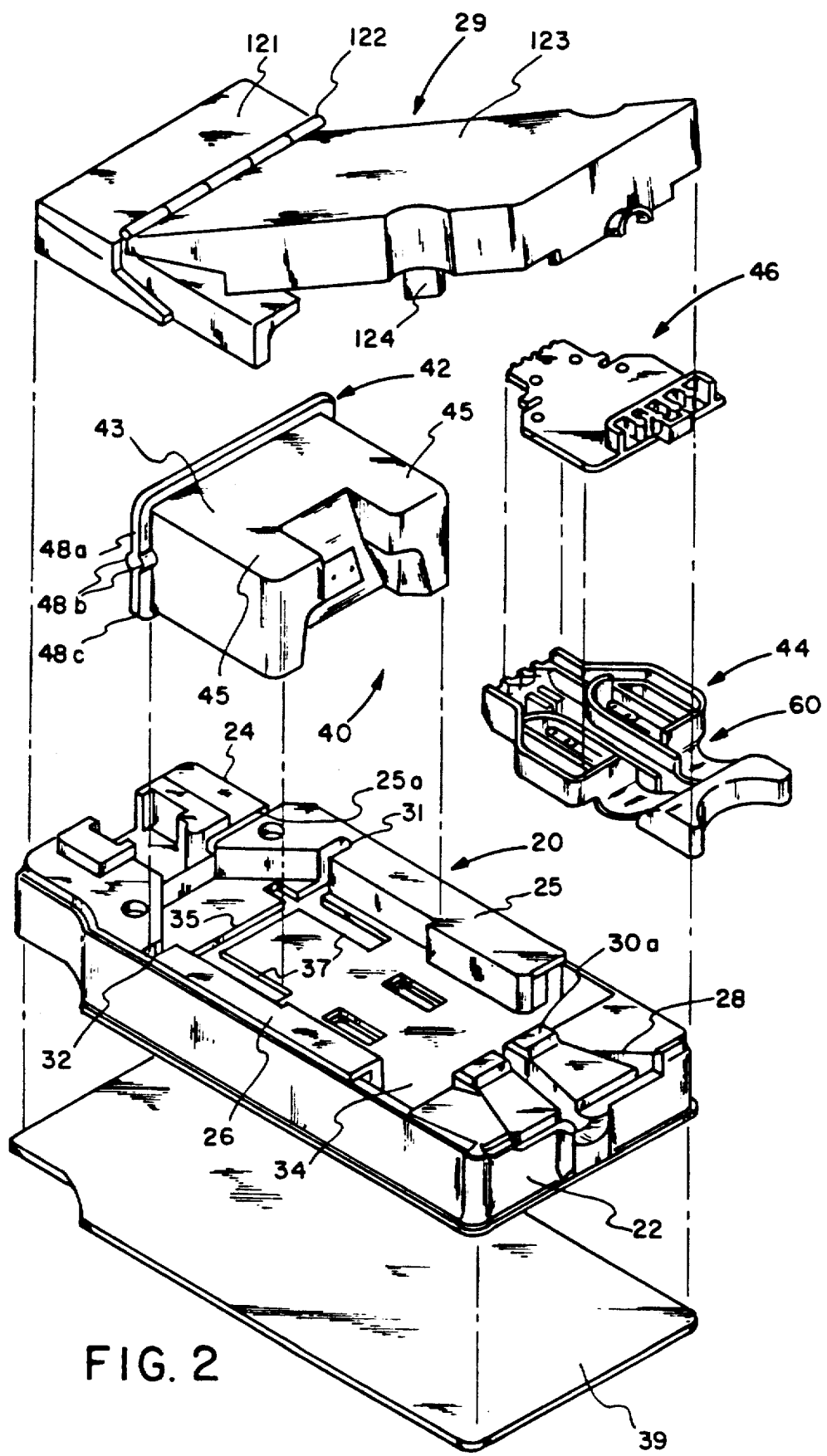
FIG. 2 is an exploded perspective view of the optical module and the fiber optic connector with a non-disposable member of the connector and a disposable member of the connector separately shown, with certain parts not shown.

An optical fiber connector enclosure 20 is shown in FIG. 1 with the improved fiber optic connector 40 of the present invention disposed therein in assembled relation. In FIG. 2, the connector enclosure 20 and the fiber optic connector 40 are shown in an exploded view which better illustrates the respective parts of the fiber optic connector which are described in greater detail below.

The connector enclosure 20 includes a main body portion 22 that is generally rectangular in shape but includes a necked-down portion 24 at an outer end thereof as shown in FIG. 2. Relatively thick lateral side walls 25 and 26 and a substantially thicker end wall 28 define a space therein for receiving the fiber optic connector 40.

The fiber optic connector 40 includes a non-disposable portion or member 42 and a disposable portion or member 44, the disposable member having a cover 46. An enclosure cover 29 overlies the main body portion 22 of the connector enclosure 20 when the connector 40 is in place.

Facing slots 31 and 32 are disposed in the respective inner faces of lateral side walls 25 and 26 of the main body portion 22 of the connector enclosure 20. The slots 31 and 32 are disposed near the necked-down portion 24 of the main body portion 22 and extend below the upper surface of a base wall 34 of the main body portion. A transverse slot 35 in the base wall 34 connects the side slots 31 and 32. Projecting forwardly of the transverse slot 35 are a pair of slots 37, each disposed adjacent a respective sidewall 25 and 26. The slots 37 each pierce the base wall 34 at their respective intersections with the transverse slot 35. Disposed forwardly of the slots 37 and generally in alignment therewith are a pair of electrical contacts 38 (FIG. 10). Each contact 38 includes a washer 38a and a screw 38b (FIG. 10B). A base plate 39 covers the bottom of the connector enclosure 22.

Figure 3:
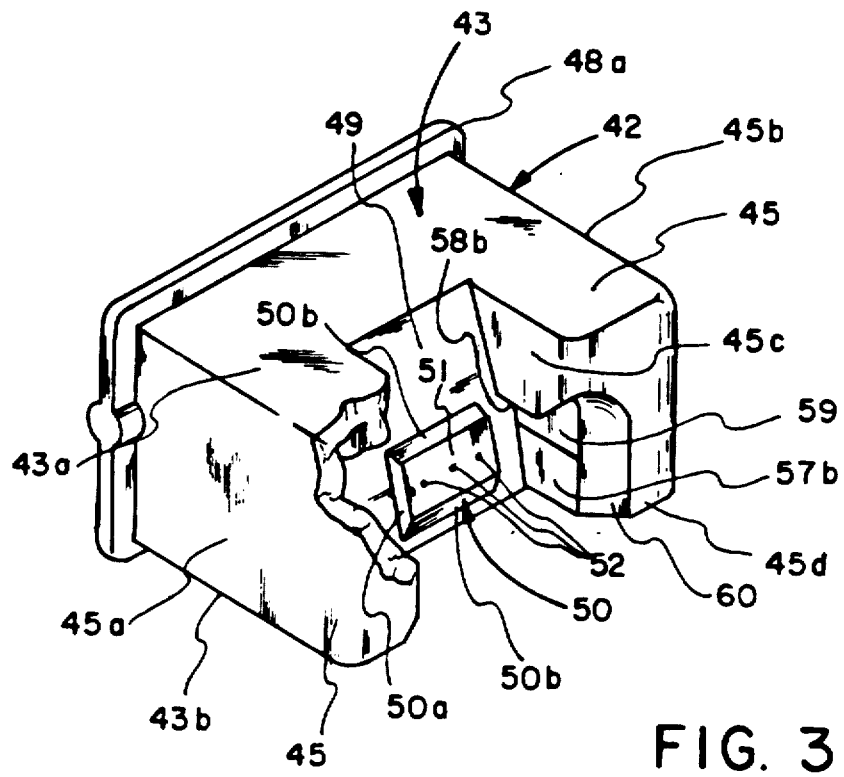
FIG. 3 is a top right perspective view of the non-disposable member of the connector of the present invention with a portion thereof broken away to better illustrate its configuration.
Figure 4:
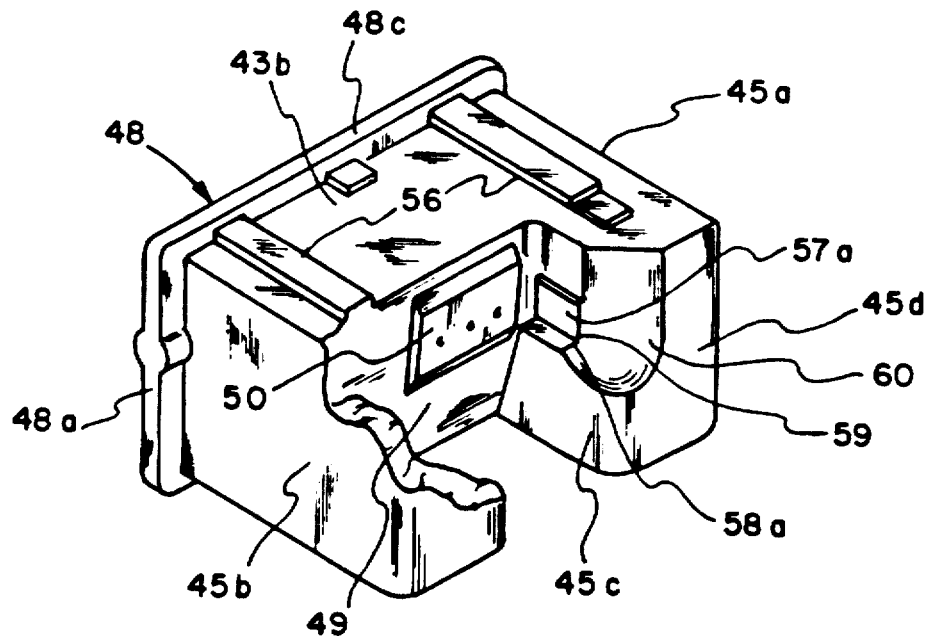
FIG. 4 is a bottom right perspective view in which the non-disposable connector member of FIG. 3 is rotated 180° to show the bottom thereof.

The non-disposable member 42 of the connector 40 is U-shaped as shown in FIGS. 3-5 and includes a base 43 with legs 45 extending forwardly from opposite ends of the base. The base 43 is substantially thicker than the legs 45. However, the non-disposable member 42 is a plastic molded part and its interior is substantially hollow with the periphery of the base 43 defined by relatively thin opposite side walls 43a, 43b and opposite end walls 45a and 45b. An outer end 47 of the base 43 opens into the interior of the member 42. A peripheral flange 48 surrounds an opening in the outer end 47 of the hollow base 43. Stiffeners 47a are provided between sidewalls 43a,b in the hollow interior of the base 43. An angled inner or front wall 49, generally disposed between legs 45 of the U-shaped non-disposable member 42, completes the base 43.

Legs 45 extend generally transversely from the base 44, in generally parallel alignment, at opposite ends thereof. The outer side portions of legs 45 are defined by forward extensions of opposite side walls 43a,b of the base 43 and the end walls 45a,b. Respective interior side walls 45c, extend forwardly from the front wall 49 of the base 43, to define respective inner side portions of the legs 45. Forward end walls 45d enclose the legs 45.

At one side of the front wall 49 of the base 43 is a forward extension or pad 50, disposed between the respective forward portions of legs 45 and supported by angled side walls 50a and angled top and bottom walls 50b, the walls 50a,b extending forwardly from the front wall 49. The walls 50a and 50b project forwardly to define an elevated abutment surface or front face 51 of the pad 50 that is somewhat smaller than the area defined by the pad on the front wall 49. Three equally spaced and centrally located openings 52, provided in the front face 51 of the pad 50, receive forward ends 53a of respective optical fibers 53 associated with a cable assembly 55. Both the front wall 49 of the base 43 and the front face 51 of the pad 50 on the front wall are canted at about 20° from the vertical or 70° from the horizontal when the non-disposable member 42 of the fiber optic connector 40 is positioned in the main body portion 22 of the connector enclosure 20. The angle of 20° chosen for the preferred embodiment should be considered illustrative and not limiting. The intent is to minimize a reflective component of light at the fiber interface. Each opening 52 receives a glass optical fiber 53, which in the preferred embodiment is about 0.0096 inches in diameter (0.0096D), or about 2 to 3 times the diameter of a human hair.

In FIG. 3, the non-disposable member 42 of the connector 40 is shown lying on its bottom face. On the underside of the non-disposable member 42, as shown in FIG. 4, transverse lateral ribs 56 extend forwardly from the base 43 of the member 42 along the legs 45 to terminate near respective end walls 45d thereof.

The pad 50 is slightly narrower than the front wall 49 of the base 43. However, on each side of the pad 50, at the front wall 49 of the base 43, inner side wall 45c of each leg 45 of the non-disposable member 42 is notched or stepped to define respective horizontal reference surfaces 57a and 57b and respective vertical reference surfaces 58a and 58b in opposite side walls 45c in the respective inner portions of legs 45. The reference surfaces 57a,b and 58a,b are associated with the optical fibers 53 mounted in the openings 52 in the pad 50 and are provided to precisely align the optical fibers 53 in the non-disposable member 42 with their counterparts in the disposable member 44, as well as to constrain respective lateral and vertical motion of the disposable member relative to the non-disposable member.

An inner step or notch 59 on each inner sidewall 45c defines a lateral reference surface 57a,b that is generally parallel with its respective inner side wall 45c, but stepped toward its respective outer side wall 45a or 45b. Vertical reference surfaces 58a,b extend inwardly from respective upper ends of reference surfaces 57a,b to intersect respective inner side walls 45c generally at a midplane thereof.

The notches 59 do not extend vertically from the front face 49 of the base 43 to the front ends 45d of the legs 45, but rather are canted towards the outer side walls 45b of the legs from about the mid point of the notch to the front ends of the legs to provide respective tapered guide surfaces 60 in respective outer legs of the non-disposable member 42. Also, the respective intersection of lateral reference surfaces 57a and 57b, vertical reference surfaces 58a and 58b, and the respective inner ends of the canted portions 60 are also rounded to guide the disposable member 44 into the non-disposable member 42 of the connector 40.

Figure 9:
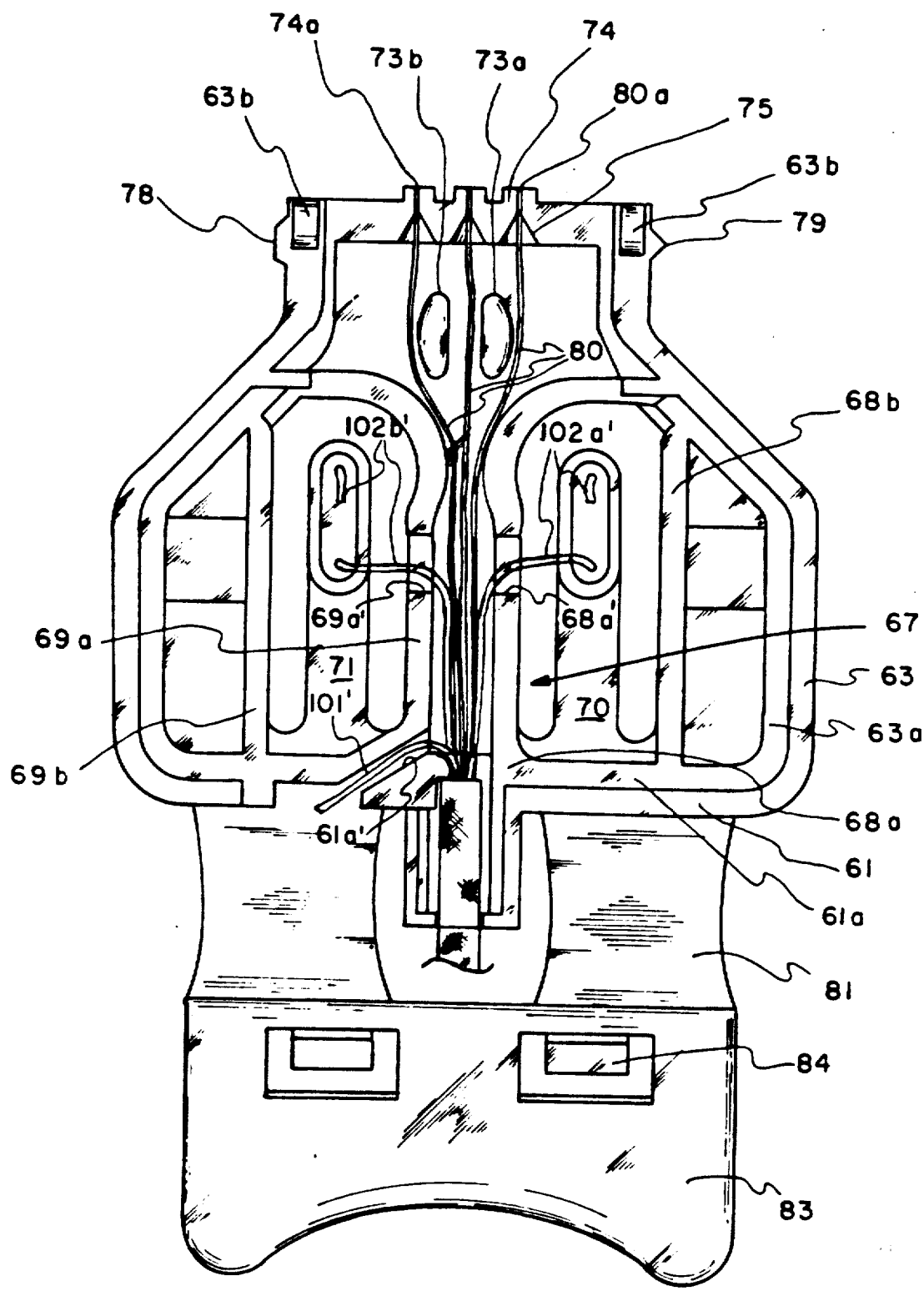
FIG. 9 is a top plan view of the disposable member shown in FIG. 7.

As shown in FIGS. 7-9, the disposable member 44 of the connector 40 is a molded plastic part having a hollowed-out main body portion 60 of generally trapezoidal shape. The hollowed-out main body portion 60 has a rear wall 61 that is longer than a front wall 62, with side walls 63 extending generally transversely from opposite ends of the rear wall 61 to slightly beyond their respective midpoints. At these mid-points, the side walls 63 bend inwardly toward the narrow front wall 62 to define a necked-down portion 64 of the disposable member 44, disposed at a front end of the main body portion 60.

The main body portion 60 features a double walled construction in which the rear wall 61 and opposite sidewalls 63 include respective inner walls 61a and 63a, which are about .070 inches lower than outer walls 61 and 63. The front wall 62 is of single wall construction, but the upper surface thereof coincides with the respective upper surfaces of walls 61a and 63a, for reasons to be described below.

A base wall 65 of the main body portion 60 features a relatively large central cutout portion 66 which is bisected by a cross member 67. Cross member 67 extends from the bottom of the necked-down portion 64 of the main body portion 60 and relatively parallel to the transverse portions of sidewalls 63, terminating about 0.200 inches outside the rear wall 61. The height of the cross member 67 approximately equals the height of the inner walls 61a and 63a.

The extension of cross member 67 between the rear wall 61 and the necked-down portion 64 partially defines a pair of openings 68 and 69 in the base wall 65 of the main body portion 60. The cross member 67 includes a channel 67a between opposite channel side walls 68a and 69a, which also respectively correspond to the inner walls of the openings 68 and 69. Respective outer side walls 68b and 69b extend transversely from the rear wall 61 to the respective inwardly tapered portions of the sidewalls 63 to define one side of the openings 68 and 69, with the forward ends of inner walls 68a and 69a curving outwardly to engage respective side walls 63 at the respective inwardly directed portions thereof to form openings 68 and 69 in the base wall 65.

Extending inwardly from the rear wall 61 into the openings 68 and 69 are respective longitudinal projections or contacting fingers 70 and 71. Fingers 70 and 71 are generally coincident with base wall 65 and extend inwardly to terminate near the upper end of respective openings 68 and 69.

Members 73a and 73b project upwardly from the base wall 65 in the necked-down portion 64 of the main body portion 60 to extend slightly above front wall 62 and side walls 63a and are generally aligned with the main portions of respective side walls 68a and 69a of the cross member 67. Front wall 62 is relatively thick and is canted at an angle that is complementary to the angle of the front wall 49 of the base 43 on the non-disposable member. The upper surface of the front wall 62 is flush with the respective upper surfaces of the inner walls 61a and 63a of the main body portion 60.

Three centrally located, equally spaced support members 74 project outwardly from the upper end of the front wall 62 and each has defined therein a central slot 75. Three discrete plastic optical fibers 80, each about 0.0046 inches in diameter (0.0046D), or about one-and-one-half times the diameter of a human hair in the preferred embodiment of the present invention are associated with a fiber optic cable assembly 76, and are each received in a respective slot 75.

At the forward end of a first side wall 63, on an outer face thereof, and generally aligned with front wall 62, is molded a first lateral reference node 78, which is wedge-shaped and generally incompressible. At the forward end and on the outer face of an opposite side wall 63, is molded a second lateral reference node 79, generally compressible, comprising a triangular "crush" rib. Nodes 78 and 79, disposed at opposite ends of the front wall 62 and generally aligned therewith, are complementary with the horizontal reference surfaces 57a,b provided in opposite side walls 45c of the non-disposable member 42.

Also, at the forward end of each outer side wall 63, on an upper surface thereof, is molded an incompressible vertical reference nodule 63b. Each nodule 63b is disposed at an opposite end of the front wall 62 and generally in alignment therewith. Vertical reference nodules 63b are complementary to the vertical reference surfaces 58a,b provided in opposite side walls 45c of the non-disposable member 42.

Connected to the outside of the rear wall 61 of the main body portion 60 is an integral plastic spring 82 having a pair of rearwardly extending flexible members 81 disposed on opposite sides of the cross member 67. Flexible members 81 terminate at a forward edge of a spring handle 83. Spring latching members 84 are provided at an inner end of the handle 83.

Overlying the main body portion 60 of the disposable member 44 is a generally L-shaped cover 46 (FIGS. 11-13) having a base wall 91, which is inserted between outer walls 61 and 63 to overlie the main body portion 60, resting on the upper surfaces of inner rear wall 61a, inner side walls 63a and front wall 62. Overlying members 73a and 73b is a cut out 91a provided on the underside of base wall 91. Cut out 91a provides clearance for the members 73a,b, which protrude slightly above side walls 63a, extending into the cutout 91a.

An upright leg 95 of the L-shaped cover 46 also supports a rearward projection 96, which overlies the rearward extension of the channel 67 from the rear wall 61 of the main body portion 60. At the front end of the cover 46, three centrally located, equally spaced inner projections 97 complement and engage the support members 74 when each optical fiber 80 of the cable assembly 76 has been placed in its respective slot 75. Inner projections 97 thus trap and hold the optical fibers 80 in a fixed position for alignment with the complementary optical fibers 53 in the non-disposable member 42. Disposed on opposite sides of the projections 97 are extensions 98, each of which have a front face 98a that is generally coplanar with respective front faces 97a on the inner projections 97.

Both the fiber optic cable assembly 55 (FIG. 6) associated with the non-disposable member 42 of the connector 40 and the fiber optic cable assembly 76 (FIG. 7) associated with the disposable member 44 are multi-strand cable assemblies and include several similar structural elements. However, their differences are significant and those differences offer an important contribution to the effectiveness of the fiber optic connector of the present invention. Accordingly, fiber optic cable assemblies 55 and 76 are discussed separately below.

The optical cable assembly 55, associated with the non-disposable member 42 of the connector 40 comprises a plurality of elongated, discrete, glass optical fibers 53. Although the fiber optic connector 40 of the present invention is not limited to a specific combination of sizes for the respective optical fibers 53 and 80, each of the optical fibers 53 of the preferred embodiment is about 0.0096 inches in diameter (0.0096D). A plurality of elongated Kevlar elements 101 are co-extensive with the optical fibers 53 to provide tensile strength to the cable assembly 55 and thus protect the relatively fragile optical fibers 53, and a pair of elongated thermocouple elements 102 co-extensive with the optical fibers 53 ar included in the cable assembly 55 for temperature measurement. The thermocouple elements 102 are metallic.

The cable assembly 55 is connected to the non-disposable member 42 of the connector 40, as follows.

The optical fibers 53, the Kevlar elements 101 and the thermocouple wires 102 are separated before assembly, with the optical fibers 53 being suitably secured into the openings 52 provided in the front face 51 of the pad 50. The optical fibers 53 are then bonded in place with a respective front face 53a of each optical fiber protruding slightly forward of front face 51 of pad 50. A suitable potting material is applied to fill the hollow interior of the non-disposable member 42, anchoring the optical fibers 53 in place.

The front face 51 of the pad 50 is then lapped with a suitable lapping tool that cants as well as smooths the front face and also grinds the respective front face 53a of each optical fiber 53 disposed therein so that it is flush with the front face. Both the front face 51 of the pad 50 and the front faces 53a of the optical fibers 53 are canted to a precise angle that is 20° from the vertical as shown in FIG. 2. This design also allows the angle to be reduced to at least 15°. Once the front face 51 and the optical fibers 53 therein have been lapped to smooth the respective faces thereof and to produce the desired angle, the non-disposable portion 42 of the connector 40 is inserted into the connector enclosure 20 as follows.

With cable assembly 55 in place, the non-disposable member 42 of the connector 40 is mounted in the main body portion 22 of the connector enclosure 20. The respective side flanges 48a of the peripheral flange 48 are disposed in the slots 31 and 32 provided in the sidewalls 25 and 26 of the main body portion 22. A lower flange 48c is received within the slot 35 provided in the base wall 34, and lateral ribs 56 running along legs 45 of the non-disposable member 42 are received in corresponding complementary slots 37 in the base wall.

A registration nodule 48b (FIG. 5) is provided at the midpoint of each side flange 48a. Nodule 48b extends outwardly thereof and engages opposite edges of a respective slot 31,32 to precisely position the non-disposable member 42 in the enclosure 20. The engagement of the lower flange 48c within the transverse slot 35 defines a precise vertical location for the non-disposable member 42 in the connector enclosure 20. With the non-disposable portion 42 fixedly mounted in the connector enclosure 20, the remaining portions of the cable assembly 55 are connected thereto as follows.

The slots 37 cut in the base wall 34 of the connector enclosure 20 undercut the transverse slot 35 at the respective intersections thereof, providing openings in the base wall 34 which enable the thermocouple wires 102 to access the underside of the connector enclosure 20. Thus thermocouple wires 102 can connect to the undersides of contacts 38. A suitable channel 25a is provided in the sidewall 25 to enable the Kevlar elements 101 to be drawn away from the cable assembly 55 and bonded to the connector enclosure 20.

The optical cable assembly 76 (FIG. 7), associated with the disposable member 44 of the connector 40 includes a plurality of elongated, discrete plastic optical fibers 80, each of which is about 0.0046 inches in diameter (0.0046D). A plurality of elongated Kevlar elements 101' coextensive with the optical fibers 80 provide tensile strength to the cable assembly 76, and thermocouple wires 102' are included to provide temperature measurements. The optical fibers 80 of the disposable member 44 are not limited to the dimensions recited in the preferred embodiment, but should be somewhat smaller in diameter than the optical fibers 53 of the non-disposable member 42 to minimize signal loss at the interface of the optical fibers in connector 40.

To connect the cable assembly 76 to the disposable member 44, the Kevlar elements 101' are separated from the optical fibers 80, and each optical fiber 80 is secured in a respective slot 75, preferably by bonding it in place. The Kevlar elements 101' are drawn into a shallow channel 61a' to be bonded therein. The channel 61a' is adjacent the channel 67a, disposed in an upper face of the rear wall 61 of the disposable main body portion 60. Thermocouple wires 102' extend along the channel 67a until they reach respective cutout portions 68a' and 69a' provided in the respective sidewalls 68a and 69a of the channel 67a, with a first wire 102a' to be inserted into a pair of openings 70a in the inner end of contacting finger 70 and a second wire 102b' to be inserted into a pair of openings 71a in the inner end of contacting finger 71. Thermocouple wires 102a', 102b, are threaded through respective openings 70a and 71a and extend to the underside of the disposable member 44, respectively defining electrical contacts 103a and 103b at the underside of the disposable member.

Projections 73a and 73b, provided in the necked-down portion 64 of the main body portion 60, separate the optical fibers 80 as they extend along the channel 67a into the slots 75 so as to avoid undue bending of the optical fibers 80 when they are placed in the slots 75. With the optical fibers 80 bonded in place in the slots 75, with the electrical contacts 103a and 103b appropriately connected to the disposable member 44, and with the Kevlar elements 101' suitably bonded to the main body portion 60 of the disposable member 44, the cover 46 is suitably affixed, preferably by bonding it to the main body portion 60 of the disposable member 44.

With the cover 46 in place, the front faces of the support members 74, and the front faces of the associated optical fibers 80 mounted therein are lapped to produce a smooth angular face 74a for each support member 74 and a smooth, angular, coplanar face 80a for each of the optical fibers 80 of the disposable member 44. The lapped angle is complementary to the 20° angle lapped onto the end faces 53a of the optical fibers 53 disposed in the end face 51 of the non-disposable member 42 of the connector 40. Only the end faces 74a of the support members 74 and their associated optical fibers 80 are lapped. The inner projections 97 on the cover 46 are not lapped. However, because the front face of each forward extension 98 does not overlie a corresponding support member, a portion of each forward extension 98 coplanar with the front faces 74a of support members 74 is lapped. Thus, a forward edge is defined on the extensions 98 that is coplanar with end faces 80a of the optical fibers 80 which are disposed in and slightly forward (0.002") of respective lapped end faces 74a.

The completed disposable member 44 of the fiber optic connector 40 includes the lapped end faces 80a of the optical fibers 80 and a completely installed cable assembly 76. The assembled disposable member 44 can then be inserted into the connector enclosure 20 as follows.

Opposite lateral reference surfaces 57a, 57b provided on the inside walls 45c of legs 45 of the U-shaped non-disposable member 42 engage the complementary lateral guide member 78 and the crush rib 79 associated with the disposable member 44 to laterally align the end faces 80a of the plastic (0.0046D) optical fibers 80 in the disposable member 44 with the end faces 53a of the glass (0.0096D) optical fibers 53 in the non-disposable member. Forward extensions 98 engage the outer edges of lapped face 51 of the pad 50 to traverse the lapped face as the disposable member 44 is inserted into the connector enclosure 20.

At the end of travel of the extensions 98, reference nodules 63b provided at the upper end faces of sidewalls 63 of disposable member 44 engage the vertical reference surfaces 58a, 58b defined in the notches 59 provided in the side legs 45 of the non-disposable member 42. The respective end faces 53a of the optical fibers 53 mounted in the non-disposable member 42 are both laterally and vertically aligned and fully engaged with the respective end faces 80a of complementary optical fibers 80 mounted in the disposable member 44.

As best seen in FIG. 10 and the details provided in FIG. 10A and 10B, with respective optical fibers 53 and 80 aligned, and respective end faces 53a and 80a fully engaged, electrical contact between the disposable member 44 and the non-disposable member 42 of the connector 40 is achieved through the connection between contacts 103a and 103b on the member 44 and the contacts 38 provided in the connector enclosure 20. The engagement of electrical contacts 103a and 103b on the disposable member 44 with the contacts 38 in the enclosure 20 also provide a vertical upward spring force that assures proper seating of the disposable member 44. The contacts 103a and 103b on the disposable member 44 complete electrical contact between the non-disposable member 42 and the disposable member 44, and the latching members 84 of the spring 82 engage complementary latching elements 30a provided in the rear wall 30 of the connector enclosure 20 to secure the disposable member 44 in place in the fully aligned position of the fiber optic connector 40.

As shown in the detail of FIG. 10A, the end faces 53a, 80a of the optical fibers 53,80 are parallel to each other, but at an oblique angle with respect to the respective parallel axes thereof. In the preferred embodiment, the respective end faces are each disposed about 20° from the vertical. Further, the non-disposable glass (0.0096D) optical fiber 53 is larger in diameter than the disposable plastic (0.0046D) optical fiber 80.

A ray propagating along the non-disposable optical fiber 53 toward the fiber interface at an angle from its axis will strike the interface, producing a reflected component and a transmitted component of normalized amplitude. Because the angle at the fiber interface is chosen to minimize unwanted reflections and to maximize data transmissions for virtually all rays within the optimum angle of the fiber interface, the reflections from the fiber interface will not be transmitted along the optical fibers 53,80 but will be propagated into a cladding surrounding them.

Since the beveled interface is effective in suppressing reflected signals transmitted along the non-disposable optical fibers 53, it can be made larger than the disposable optical fiber 80 without creating a significant reflected signal.

With the connector 40 fully assembled, the enclosure cover 29 (FIG. 2) is placed on the enclosure 20. A rear end 121 of the cover 29 is bonded to the connector enclosure 20 using a suitable adhesive. The cover 29 is hinged at 122 with a front cover portion 123 overlying the main body portion 22 of the connector enclosure 20. Latching members 124 extend downwardly from the front cover portion 123 to engage the respective inner walls 25 and 26 of the connector enclosure 20 to secure the cover 29 in a closed position on the main body portion 22 of the connector enclosure 20.

Having described a preferred embodiment of the present invention, it should be understood that other embodiments could be defined within the claims which set forth the invention. For example, the need to precisely align optical fibers, which may be as little as five thousandths of an inch (0.005") in diameter, indicates that the apparatus herein defined for use with a cable assembly having multiple optical fibers would be equally useful in connecting a single optical fiber at the fiber interface of the connector. Further, the dimensions of the respective optical fibers mounted on the non-disposable and disposable members of the connector are not limited to the dimensions recited for the preferred embodiment of the present invention.

We claim:

1. In a fiber optic connector comprising first and second optical fibers, the first optical fiber having a beveled end face, the second optical fiber having a complementary beveled end face;
   a method for aligning said first and second optical fibers at a fiber interface comprising:
   abutting the respective fiber end faces at an angle at the interface;
   providing a vertical reference surface associated with the first optical fiber;
   providing a vertical reference nodule associated with the second optical fiber;
   cooperatively engaging said vertical reference surface with said vertical reference nodule to align the respective fiber end faces at a vertical aligned position for the connector;
   providing a horizontal reference surface associated with the first optical fiber;
   providing a horizontal reference node associated with the second optical fiber;
   cooperatively engaging said horizontal reference surface with said horizontal reference node to align the respective fiber end faces at a horizontal aligned position for the connector; and
   holding said first and second fiber end faces in abutting and full engagement at the fiber interface in a fixed aligned position, in which the vertical aligned position is coincident with the horizontal aligned position for the optical fibers of the connector.

2. The method as claimed in claim 1 including the step of inclining a front face of a non-disposable member of the connector to provide a ramp; mounting the end face of the optical fiber in said front face;
   inclining a front face of a disposable member of the connector to be complementary to the inclined non-disposable front face; and
   mounting the end face of the second optical fiber in said complementary front face, to facilitate engagement and alignment at the fiber interface of the connector.

3. The method claimed in claim 2 including the step of disposing the fiber interface at an angle of 15 to 30 degrees from a vertical plane at the interface of the connector.

4. The method claimed in claim 3 including the step of receiving the first optical fiber in an opening provided in a pad disposed on the non-disposable front face; and
   beveling the pad at the same angle as the end face of the first optical fiber.

5. The method claimed in claim 2 including the step of disposing the front face of the non-disposable member between a pair of forwardly extending legs disposed on opposite sides of a base of a U-shaped hollow disposable member.

6. The method claimed in claim 2 including the step inclining a mid-portion of said non-disposable front face between opposite side walls of the non-disposable connector member;
   disposing a notch in at least one of the side walls adjacent the connector interface at the inclined mid-portion and somewhat above a mid-plane of the side walls of the non-disposable connector member; and
   defining a horizontal reference surface for the end face of the optical fiber disposed in the non-disposable connector member with a first vertical side wall of the notch adjacent the inclined mid-portion.

7. The method claimed in claim 6 including step of defining a vertical reference surface for the end face of the first optical fiber disposed in the front face of the non-disposable connector member with a horizontal side wall of the notch transverse to the vertical side wall.

8. The method claimed in claim 7 including the step of tapering the notch providing the horizontal and vertical reference surfaces at a forward end to facilitate movement of the disposable member into the non-disposable member toward the fixed aligned position for the assembled connector.

9. The method claimed in claim 2 including the step of first engaging the front face of the non-disposable connector member with forwardly placed wear surfaces provided on the front face of the disposable connector member, when the disposable member is moved toward the non-disposable member for alignment.

10. The method claimed in claim 9 including the step of bounding the disposable front face with opposite forward lateral edges of the disposable connector member;
    mounting a substantially incompressible, horizontal reference node on one forward lateral edge adjacent the connector interface;

mounting a compressible crush rib on an opposite forward lateral edge in alignment with the reference node. the reference node serving to engage the horizontal reference surface of the non-disposable member;

engaging an opposite side wall thereof with the crush rib; and cooperatively guiding the disposable member to a terminal horizontal reference position defined at the intersection of the horizontal and vertical reference surfaces of the connector.

11. The method claimed in claim 10 including the step of bounding opposite ends of the disposable front face with respective side walls of a main body portion of the disposable connector member, mounting on respective forward upper surfaces of said side walls adjacent the front wall, at the connector interface, a reference nodule; and engaging each reference nodule with respective vertical references surface of the non-disposable member at a terminal vertical reference position defined at the intersection of the horizontal and vertical reference surfaces of the connector.

12. The method claimed in claim 2 comprising the step of retaining the disposable and non-disposable connector members nested within a connector enclosure, and engaging a spring integral with the rear end of the disposable member with the connector enclosure, to secure the disposable and non-disposable members in a fixed aligned position of the optical fibers in the connector.

13. The method claimed in claim 12 including the step of receiving a complementary flange provided at the outer end of the non-disposable connector member in registration slots provided in respective side walls of the connector enclosure.

14. The method claimed in claim 13 including the step of engaging registration nodes provided on the flange associated with the non-disposable member with the slots in the connector enclosure to position the non-disposable member at a precise forward position within said enclosure, and engaging a transverse slot provided between the side slots with the base of the flange to define a registration position for retaining the non-disposable member in a fixed position within the enclosure.

15. The method claimed in claim 14 including the step of engaging the transverse slot receiving the base flange of the non-disposable member with a pair of parallel slots adjacent respective side walls of the connector enclosure to define respective openings in a base wall of the connector enclosure; and receiving electrical conductors associated with a cable assembly retaining the optical fibers of the non-disposable member in said openings.

16. The method claimed in claim 15 including the step of receiving reinforcing fibers of the cable assembly in a side channel of the connector enclosure.

17. The method claimed in claim 16 including the step of connecting electrical contacts in the non-disposable connector member to the connector enclosure, engaging electrical connections provided on respective contacting fingers of the disposable connector member with the connector enclosure, and electrically connecting the disposable and non-disposable members of the connector with the alignment of the respective end faces of the optical fibers at the fiber interface in the fixed aligned position of the connector within the connector enclosure.

* * * * *